UNITED STATES PATENT OFFICE.

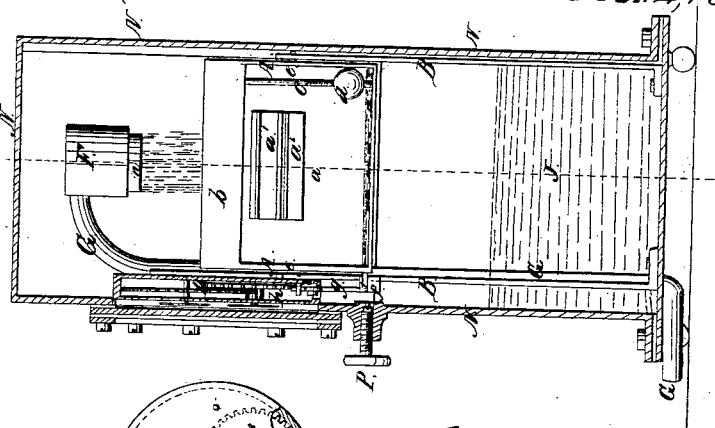
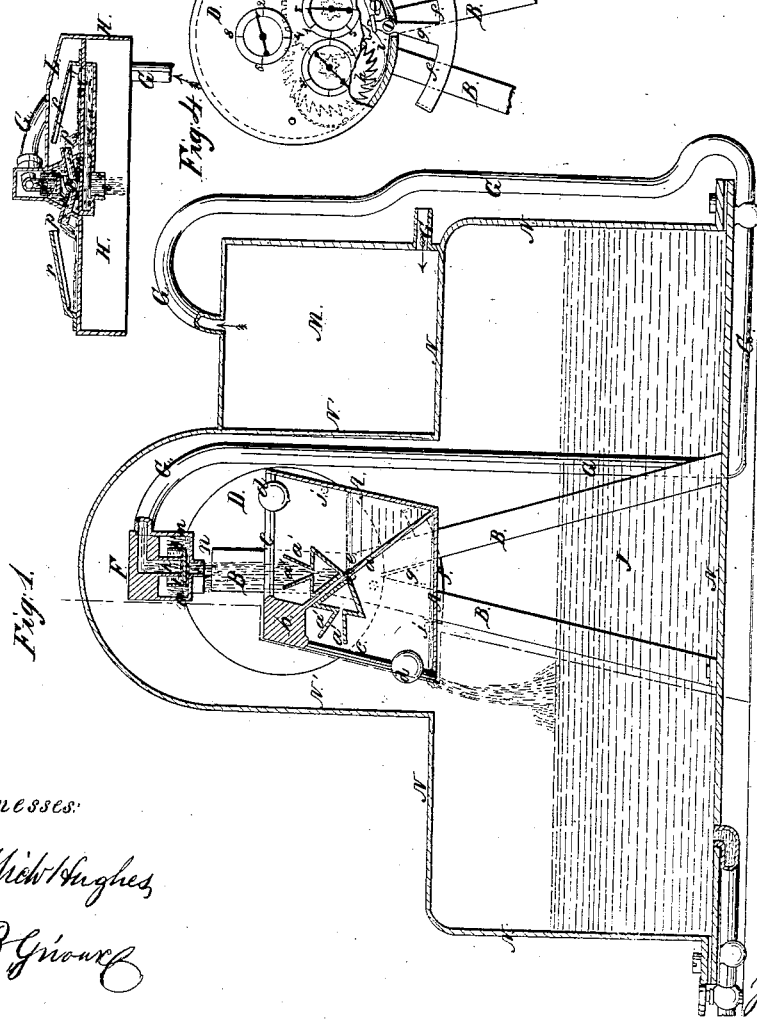

E. P. FARRAR, OF NEW YORK, N. Y., AND J. N. FARRAR, OF PEPPERELL, MASSACHUSETTS.

WATER-METER.

Specification of Letters Patent No. 27,118, dated February 14, 1860.

*To all whom it may concern:*

Be it known that we, E. P. FARRAR, of the city, county and State of New York, and J. N. FARRAR, of Pepperell, in the county of Middlesex and State of Massachusetts, have invented certain new and useful Improvements in Meters for Measuring Water; and we do hereby declare that the following is a full, clear, and exact description thereof, reference being had to the accompanying drawings, forming a part of this specification, in which—

Figure 1, represents a longitudinal vertical section taken through the meter box and the several parts for measuring water, and looking in the direction of the front of the meter. Fig. 2, is a vertical section taken through the meter as indicated by the course of the red line $x, x$, in Fig. 1. Fig. 3, is a longitudinal section showing the interior arrangement of a box to be attached to the inlet pipe for measuring only a fractional amount of the water passing through the meter, to be used in place of that shown in Figs. 1 and 2, where large quantities of water are consumed. Fig. 4, is a front view of the dial plate with the index hands for registering the amount of water as it escapes through the meter, behind this dial plate and inclosed in a tight box is a system of wheel work which is operated simultaneously with the device for measuring the water falling from the inlet pipe.

Similar letters of reference indicate corresponding parts in the several figures.

This invention is to enable the consumer of water, where it is supplied through cities from a common reservoir, to register his consumption so that he may be able to ascertain by an inspection of his meter the exact amount of water consumed during the space of a week, month, or year, in the same manner as the consumption of gas is registered by the meters furnished for this especial purpose. The meter is constructed so that the operating parts cannot be tampered with by fraudulent persons, and so that nearly an accurate registration of the quantity of water used may be effected with a uniform or ununiform pressure of the head or source. It also has for its object the measuring of only a fractional portion of the water consumed, as for instance in hotels or other establishments where large quantities of water is daily consumed by providing for measuring only a fractional part of the water passing through the meter, an accurate registration may be obtained by the use of a comparatively small meter, and at the same time a free and uninterrupted supply may be had.

Our invention and improvement in water meters, or in fact in meters for measuring any kind of liquid consists in constructing a mouth piece or break water furnished with any suitable number of outlets and the water allowed to escape, excepting at one of the outlets, without being measured by the tilt-box, or affecting it in any way, so that where a large quantity of water is used, only a given amount of this will be registered, from which the entire amount can readily be computed.

It further consists in inclosing the above described mechanism within an air-tight casing, furnished with a secondary receptacle, and an air cock by which a regular current or flow of water, may be kept up however varying may be the pressure of the head or source, and by which the mechanism may be kept in good working order, all as hereinafter described.

To enable those skilled in the art to fully understand our invention, we will proceed to describe its construction and operation.

In the drawings A represents a quadrangular box divided into separate apartments by a partition $a$ which extends across said box from corner to corner and is loaded on its uppermost edge as represented by $b$ for the purpose of giving greater momentum to the box in its vibration or oscillation. This box is also furnished with screw rods $c$ and balls $d$ for balancing the box upon its pivots. It is also furnished on its bottom or on each side of the partition $a$ with strips of sheet metal $a'$ but in such a way that the water falling into the box will be received by these plates and be deflected toward the partition, and over the center of its suspension thus preventing the weight of the flowing water from upsetting the box from this cause. This tilting and measuring box is hung in standards B by pivots $e$ so that it will swing freely, and so that at each oscillation it will strike the arc $f$ of lever $g$ and alternately operate a ratchet, or escapement wheel $h$, through the medium of a curved pawl $i$, which latter with the ratchet wheel is arranged in a circular case D. The ratchet wheel $h$ thus receives an impulse from each movement of the tilting box A and transmits a rotary movement to a system of wheel work arranged in case D; and by a suitable dial plate and dial hands an accurate registration of the movements of the tilting box will be made, which registrations may be read off from the outside of the box or instrument similar to those of a gas or other meter. The movement of the wheel work will of course be made to coincide with that of the tilting box and the quantity of water it discharges at each movement. The tilting box A, has two studs $j$, projecting from its side which alternately strike the ends of arc $f$ of lever, and operate it as above shown.

F represents a mouth piece which is attached to the induction or inlet pipe G, and by bending said pipe is brought directly over the center of motion of the tilting box A, so that the water will fall directly from the oblong mouth of this box F into either one or the other compartment of the tilting box. The construction of this mouth piece is peculiar and is such that the water entering from pipe G will take an upward course before it can escape through the oblong aperture in its bottom; the force of the current is thus broken, and the tilting box A, will not receive the full force or impact of the head, it will consequently not be upset before it receives its full supply or measured quantity of water. This mouth piece F. consists of a cylindrical hollow box, with a tube $k$, which communicates directly with the pipe G, with a cup $l$ placed under the tube $k$. This cup is surrounded by a chamber $m$ from which the water finally escapes through an oblong aperture $n$ in its bottom. This mouth piece is made of sufficient size to allow of the free escape of water, but to break the force of the current before it is allowed to flow into the tilting box.

The full flow of water passes through the mouth piece F, and indicated upon the dial plate, but for establishments where large quantities of water are used an instrument to measure all this water would be too large and expensive to supply the demand. We have therefore constructed another, which, although it differs somewhat in its construction, the principle is precisely the same. This device is to be attached to the induction pipe in the same way as the one above described, but from chamber $m$, Fig. 3, radiate small tubes $p$ each of which conducts away a certain quantity of water which is not measured or indicated; upon the dial plate $r$, are deflecting plates for the water issuing from these tubes $p$ and H is a box or cover, over which the water from these pipes $p$ flow and which prevents it from falling into the tilting box A. This water from tubes $p$ which is not measured falls down and is received by the reservoir J from which it is drawn for use. One of these tubes $p$ is incased within a box L, from which the water issuing from said tube, escapes through aperture $i'$, and is conducted to a central opening $i''$ from which it escapes and flows down into the box A, and is measured and registered as above described for mouth piece F.

To illustrate the operation of this latter device suppose four tubes, as represented by the drawings Fig. 3, are employed to conduct the water from chamber $m$ and each tube be arranged so that it will admit an equal quantity of water to escape. The water escaping from three of these tubes is allowed to flow off without being measured but to be received into a reservoir for consumption, one of these tubes is confined so that one fourth of the water escaping from the pipe G is suitably conducted over the tilting box A and is measured by this box, the motions of which are registered upon the dial plate in the same manner as described for the single opening mouth piece F. The full supply of water may thus be obtained with only a fractional portion of it subjected to the measuring operation.

The radial tubes $p$ $p$ $p$ $p'$ are all inclined inward, so that the water in chamber $m$ will always keep level with the mouths of each tube, and so that air will not get above the cup $l$.

In the drawings the inlet pipe G is shown passing up from the bottom of the case N, through the reservoir J, but in practice this pipe will pass directly from the mouth piece F through the side of case N, to the top of a secondary chamber M, and from the bottom of this chamber, this inlet or service pipe leads to the street main.

The tilting and measuring box A with the mouth piece F or that of Fig. 3, is incased within an air tight box N, N', which is furnished with an air cock P placed in its side at a suitable height from the bottom of the box for the purpose of drawing an excess of air from the box or for admitting air into the same, according to the force or head of water, so that a perpetual equilibrium may be maintained between the air in the box and the head of water.

The pressure of the water in the reservoir or at the source is exceedingly variable or intermitting, and should the apparatus be used without chamber M, and the pressure of the head vary at all, the whole apparatus would become inoperative, and in the event of setting the apparatus so as to operate with a full head of water, should this head become reduced, the water in the reservoir J, will rise and force the air above it out, and it would eventually escape through the service pipe. Therefore to insure the perfect operation of the meter under different heads of water, and to dispense altogether with valves, we place a chamber M on one side of the case N' which will receive the air should it escape into pipe G, and keep up a true equilibrium, should the pressure be diminished below that point to which the apparatus is first adjusted. It will thus be seen that by the introduction of chamber M, that we dispense with valves and can effect an accurate registration of the quantity of water used with an ununiform pressure of the head or source.

Having thus described our invention, what we claim and desire to secure by Letters Patent, is—

1. We claim in combination with a mouth piece constructed as described the arrangement of any suitable number of radial and inclined tubes applied to said piece in such a way that each will eject its equal share of water; this we claim in combination with box H, deflecting plates $r$, one over each tube, and secondary box M, all arranged substantially in the manner and for the purposes herein set forth.

2. We claim in combination with the air tight casing and tilting or measuring vessel or its equivalent the secondary receptacle M, communicating with the top of case N', and arranged in connection with the inlet pipe G, substantially in the manner and for the purposes described.

E. P. FARRAR.
J. N. FARRAR.

Witnesses:
 MICH. HUGHES,
 B. GIROUX.